C. MEIER.
CONCRETE MIXER.
APPLICATION FILED AUG. 10, 1912.

1,052,079.

Patented Feb. 4, 1913.

Witnesses:
M. L. Jennings.
M. D. Fry.

Inventor,
Christofer Meier, by
G. C. Kennedy,
Attorney.

UNITED STATES PATENT OFFICE.

CHRISTOFER MEIER, OF BREMER COUNTY, IOWA.

CONCRETE-MIXER.

1,052,079. Specification of Letters Patent. Patented Feb. 4, 1913.

Application filed August 10, 1912. Serial No. 714,442.

*To all whom it may concern:*

Be it known that I, CHRISTOFER MEIER, a citizen of the United States of America, and a resident of Bremer county, Iowa, have invented certain new and useful Improvements in Concrete-Mixers, of which the following is a specification.

Figure 1:
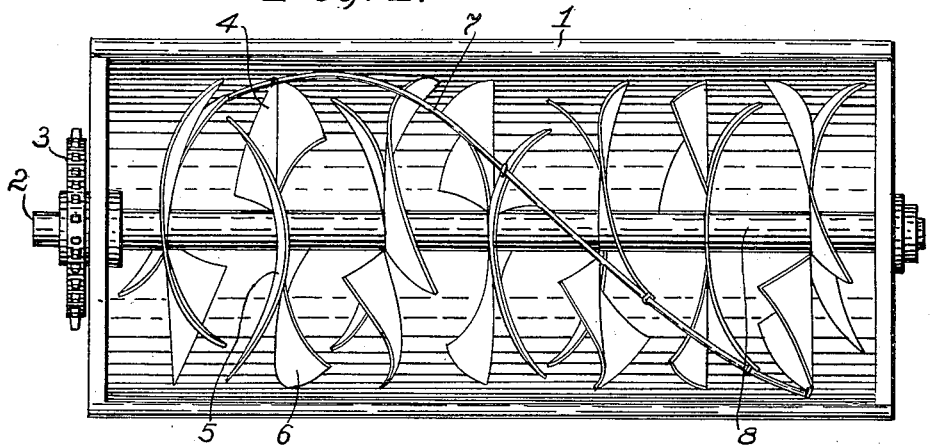
Figure 2:
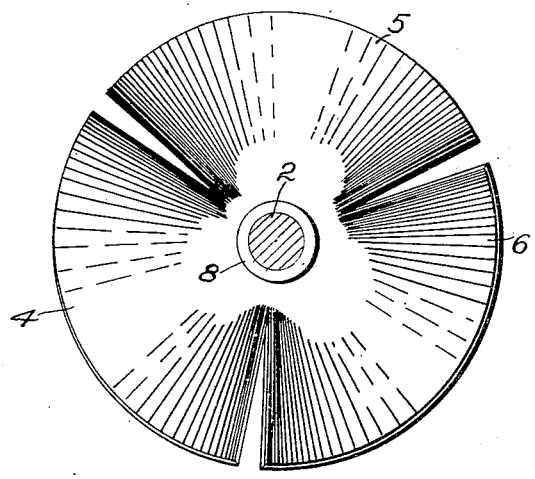

My invention relates to improvements in concrete mixers, and the object of my improvement is to furnish for that type of mixers which consists of a plurality of mixing and conveying screw-blades rotatable on a longitudinal shaft in a trough or other receptacle, such a form of screw-blades as will most efficiently perform the duty required, with additional stirring and mixing-means adapted to keep the materials in the trough from settling in the process of mixing. This object I have accomplished by the means which are hereinafter described and claimed, and which are illustrated in the accompanying drawings, in which:

Figure 1 is a plan view of my improved concrete-mixer. Fig. 2 is an enlarged elevation of one of the rotary screws, having its vanes formed according to the principles of my invention.

Similar numerals of reference denote corresponding parts throughout the several views.

My improved apparatus comprises an open trough 1, which is closed at one end only, and in which is mounted for rotation a longitudinal shaft 2, adapted to be driven by a sprocket-wheel mounted thereon at 3, the said wheel driven by any source of power desired. Upon this shaft 2 are removably secured a plurality of screws, as shown in said Fig. 1, each screw having three blades or vanes, 4, 5 and 6. The screws are secured and held apart by spacing sleeves 8 removably mounted on said shaft 2.

My invention resides in the peculiar and novel forms and arrangement of the said blades or vanes in each screw.

Referring to Fig. 2, it will be seen that one only of the three screw-blades, namely, the vane or blade 4, is a true propelling or conveyer-blade, having one radial edge directed forwardly and the other like edge directed rearwardly at a small angle in each case. The blades 5 and 6 are of like form and dimensions, but reversed with relation to each other. Each of said blades 5 and 6 is formed with both its radial edges turned to the same side or direction, either forwardly or rearwardly, as the case may be. The blades are formed by cutting radially into a disk of metal, and then bending the radial edges in the desired directions, but the screws may be otherwise shaped, provided the blades preserve the forms shown and described herein.

When the shaft 2 is rotated, the action of the screws upon the unmixed materials is to propel with the single vanes 4, and to mix with the other blades 5 and 6. It is true that the propelling blades 4 do some mixing, but the blades 5 and 6, by reason of the opposition of their like-directed edges, causes a more thorough stirring of the materials and hold them longer in the trough, than would be the case were all the blades formed to be propelling-blades.

In order to stir up the heavier components, whether broken stone or other materials, which tend by reason of gravity to accumulate in the bottom of the trough 1, and cause them to be more thoroughly mixed with the other elements and prevented from clogging the moving parts, I have placed and affixed a spiral rod 7 about the outer edges of certain of the screw-blades as shown, so that when rotated, the same will act as a scraper upon the adjacent inner surface of the trough. This rod when turning, throws up any sediments or collections of broken stone, and aids in passing the same along to a more perfect mixture, and beats the contents in rotating, whipping through the materials and aiding the action of mixing.

Having described my invention, what I claim as new, and desire to secure by Letters Patent, is:

1. In combination, a trough, a rotatable shaft mounted therein, a plurality of spaced-apart screws mounted thereon, each screw having three blades, of which one is a propeller-blade with one radial edge bent forwardly and its other radial edge bent rearwardly, while one of the other blades has both its radial edges bent forwardly, and the third blade has both its radial edges bent rearwardly, and a rod extended longitudinally along the circumferential edges of said screws and secured thereto, to serve as a scraping mixer thereon.

2. In combination, a trough, a rotatable shaft mounted therein, a plurality of spaced-apart screws mounted thereon, each screw having three blades, of which one is a propeller-blade with one radial edge bent forwardly and its other radial edge bent rearwardly, while one of the other blades has both its radial edges bent forwardly, and the third blade has both of its radial edges bent rearwardly, and a rod extended longitudinally and spirally along and about the circumferential edges of said screws to serve as a scraping mixing-means.

Signed at Waterloo, Iowa, this 22nd day of July, 1912.

CHRISTOFER MEIER.

Witnesses:
W. H. BRUNN,
GEO. C. KENNEDY.

Copies of this patent may be obtained for five cents each, by addressing the "Commissioner of Patents, Washington, D. C."